(12) United States Patent
Tanaka et al.

(10) Patent No.: US 6,514,441 B1
(45) Date of Patent: Feb. 4, 2003

(54) RADIAL TIRE MANUFACTURING METHOD

(75) Inventors: Teruo Tanaka, Tokyo (JP); Yukio Saegusa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/572,784

(22) Filed: May 17, 2000

(30) Foreign Application Priority Data

May 18, 1999 (JP) .............................. 11-136950
Apr. 10, 2000 (JP) ...................... 2000-108400

(51) Int. Cl.[7] .............................. B29C 35/02
(52) U.S. Cl. ..................... 264/40.1; 264/326
(58) Field of Search ................ 264/40.1, 315, 264/326

(56) References Cited

FOREIGN PATENT DOCUMENTS

| JP | 4-76295 | 12/1992 |
| JP | 6-182903 | 7/1994 |

OTHER PUBLICATIONS

Patent Abstracts of Japan, 04193528, Jul. 13, 1992, vol. 016, No. 523.

*Primary Examiner*—Mathieu D. Vargot
(74) *Attorney, Agent, or Firm*—Sughrue Mion, PLLC

(57) ABSTRACT

In order to manufacture a radial tire, first, in an average waveform recording step, a waveform component of radial force variation (RFV) by a molding factor in each molding machine, and a waveform component of RFV by a vulcanization factor in each vulcanizer are respectively acquired and recorded in a computer. In a waveform synthesizing step, a radial run-out (RRO, that is, vibrations resulting from non-uniformity of a tire surface) waveform of a green tire is substituted by an RFV waveform component and is made to overlap with respective RFV waveform components of waveforms of a molding factor and a vulcanization factor, thereby obtaining an RFV composite waveform. In a selection step, a circumferential position on the green tire at which an amplitude of the RFV composite waveform becomes minimum, and the circumferential position in a vulcanization mold are selected. Further, in a vulcanization step, based on the selected circumferential positions, the green tire is disposed and vulcanized in the vulcanization mold. As a result, a radial tire of which RFV is sufficiently reduced can be obtained.

16 Claims, 5 Drawing Sheets

WAVEFORM OF MOLDING FACTOR
IN VULCANIZED TIRE

REFERENCE
POSITION OF
GREEN TIRE

WAVEFORM OF VULCANIZATION FACTOR
IN VULCANIZED TIRE

REFERENCE
POSITION OF
VULCANIZATION

F I G. 6
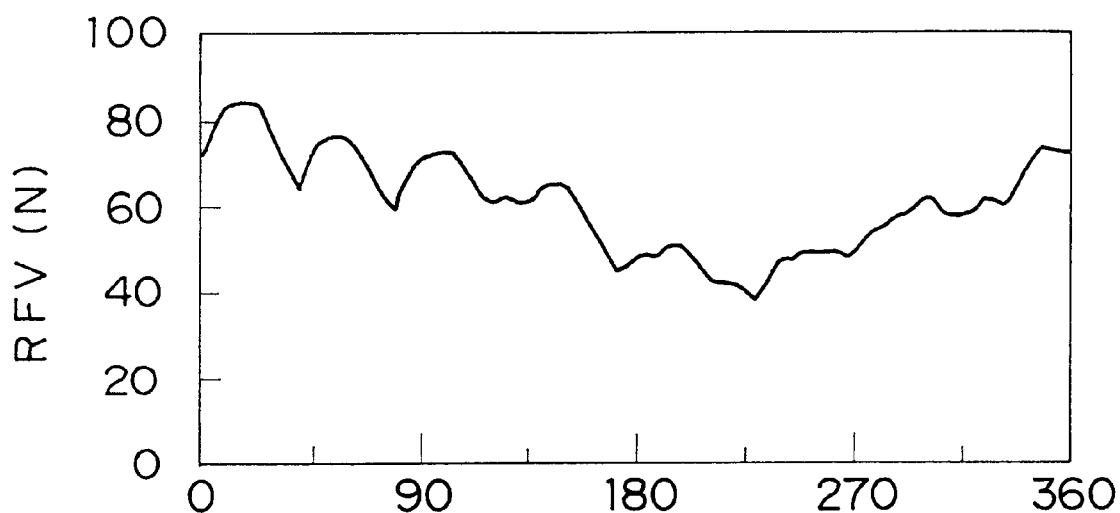
POSITION($\theta$) AT WHICH GREEN TIRE
IS PUT IN FURNACE (DEG)

RADIAL TIRE MANUFACTURING METHOD

BACKGROUND OF THE INVENTION

1. Field of the Invention

The present invention relates to a radial tire manufacturing method, and particularly to a radial tire manufacturing method which allows reduction in radial force variation (RFV) of a radial tire.

2. Description of the Related Art

In a radial tire, conventionally, due to non-uniformity (hereinafter referred to as radial run-out or RRO) in a radial direction of a green tire, which is caused by formation of tire structural members, and vulcanization factors of a vulcanizer, radial direction force variation (RFV) is generated in a vulcanized tire.

The RFV of a radial tire greatly affects vehicle vibrations and the comfort of ride, and therefore, various attempts to reduce the RFV have been made.

Typically, as disclosed in Japanese Patent Application Publication (JP-B) No. 4-76295, a radial tire manufacturing method has been proposed in which an average waveform of force variation of a green tire, which is a molding factor, and an average waveform of force variation of a vulcanization mold, which is a vulcanization factor are offset with each other. However, in this method, a difference is made between the average waveform of force variations of green tires and each of force variation waveforms of green tires, and therefore, these factors cannot sufficiently be offset. Accordingly, the force variation could not sufficiently be reduced.

Further, there has been proposed, as disclosed in Japanese Patent Application Laid-Open (JP-A) No. 6-182903, a radial tire manufacturing method in which a waveform of radial run-out (RRO), that is, out of roundness, of a green tire and a waveform of a vulcanization factor are offset with each other. In this method, the molding factor is replaced by the RRO waveform of a green tire, but a rigidity factor which cannot be detected in the RRO waveform, or gauge variation caused by slippage of a cap and a layer member during vulcanization in a high-performance tire is not taken into consideration. Accordingly, the radial force variation (RFV), that is, variations of reaction force acting in a radial direction could not sufficiently be reduced.

The above-described rigidity factor and gauge variation are each a molding factor (fixed factor) determined based on a tire construction.

SUMMARY OF THE INVENTION

In view of the above-described facts, it is an object of the present invention to provide a radial tire manufacturing method in which force variation in a radial direction of each tire can be sufficiently reduced.

In accordance with a first aspect of the present invention, there is provided a radial tire manufacturing method comprising the steps of: (a) measuring an radial run-out (RRO) waveform of each green tire; (b) recording an average waveform component of radial force variation (RFV) of a molding factor in each molding machine for molding a green tire, and an average waveform component of RFV of a vulcanization factor in each vulcanizer for vulcanizing a green tire, in a computer, including the step of obtaining the average waveform component of RFV of the molding factor and of the vulcanization factor; (c) obtaining an RFV composite waveform including the sub-steps of: (1) converting an RRO waveform of each green tire into an RFV waveform component; and (2) synthesizing respective average waveform components of RFV by the molding factor and by the vulcanization factor, with the RFV waveform component; (d) selecting a circumferential position on a green tire at which an amplitude of the RFV composite waveform becomes minimum, and a circumferential position in the vulcanization mold; and (e) vulcanizing the green tire including the sub-steps of: (1) positioning the circumferential position on the green tire to the circumferential position in the vulcanization mold; and (2) loading the green tire in the mold.

The radial tire manufacturing method according to the first aspect of the present invention will be described hereinafter.

In the radial tire manufacturing method according to the first aspect of the present invention, first, in the RRO waveform measuring step, an RRO waveform of a green tire to be vulcanized is measured by a laser displacement meter or the like, and inputted to a computer.

Further, in the average waveform recording step, an average waveform component of RFV by a molding factor is in advance acquired for each molding machine and is recorded in a computer, and an average waveform component of RFV by a vulcanization factor is in advance acquired for each vulcanizer and recorded in a computer.

In the waveform synthesizing step, an RFV waveform component obtained by converting the RRO waveform of a green tire is made to overlap with respective average waveform components of RFV by the molding factor and the vulcanization factor, and an RFV composite waveform is thereby obtained.

In the selection step, the circumferential position on the green tire at which an amplitude of the RFV composite waveform becomes minimum, and the circumferential position in the vulcanization mold are selected.

In the vulcanization step, based on the circumferential position on the green tire at which an amplitude of the RFV composite waveform becomes minimum, and the circumferential position in the vulcanization mold, which positions are selected in the selection step, the green tire is mounted and disposed in the vulcanization mold, and thereafter, vulcanized.

As a result, a radial tire of which radial direction force variation (RFV) is sufficiently reduced can be obtained.

In the radial tire manufacturing method according to the present invention, preferably, the step of recording an average waveform component of radial force variation (RFV) of a molding factor in each molding machine for molding a green tire, and an average waveform component of RFV of a vulcanization factor in each vulcanizer for vulcanizing a green tire, in a computer, wherein the step comprises the sub-steps of: (1) sampling at least two vulcanized tires; (2) offsetting the molding factor from a plurality of RFV waveforms of the vulcanized tires; and (3) obtaining an average waveform component of RFV by the vulcanization factor.

Next, a preferable method of manufacturing a radial tire according to the present invention will be described.

In the radial tire manufacturing method of the present invention, preferably, in the average waveform recording step, at least two vulcanized tires are used as samples, and by offsetting a molding factor from a plurality of RFV waveforms obtained from vulcanized tires, the average waveform component of RFV by a vulcanization factor is acquired.

The number of samples of vulcanized tires used to offset the above-described molding factor is at least two, but when a large number of samples is used, a high-accurate average waveform component of RFV by a vulcanization factor can be obtained.

In the radial tire manufacturing method according to the present invention, preferably, the step of recording an average waveform component of radial force variation (RFV) of a molding factor in each molding machine for molding a green tire, and an average waveform component of RFV of a vulcanization factor in each vulcanizer for vulcanizing a green tire, in a computer, wherein the step comprises the sub-steps of: (1) sampling at least two vulcanized tires; (2) offsetting the molding factor from a plurality of RFV waveforms of the vulcanized tires; and (3) obtaining an average waveform component of RFV by the molding factor.

Next, a preferable method of manufacturing a radial tire of the present invention will be described.

In the radial tire manufacturing method of the present invention, preferably, in the average waveform recording step, at least two vulcanized tires are used as samples, and by offsetting a vulcanization factor from a plurality of RFV waveforms obtained from vulcanized tires, the average waveform component of RFV by a molding factor is acquired.

The number of samples of vulcanized tires used to offset the above-described vulcanization factor is at least two, but when a large number of samples is used, a high-accurate average waveform component of RFV by a molding factor can be obtained.

In the radial tire manufacturing method according to the present invention, preferably, the step of recording an average waveform component of radial force variation (RFV) of a molding factor in each molding machine for molding a green tire, and an average waveform component of RFV of a vulcanization factor in each vulcanizer for vulcanizing a green tire, in a computer, wherein: if at least two vulcanization molds are provided in a vulcanizer, including the steps of: (1) obtaining an average waveform component of RFV by a vulcanization factor for each vulcanization mold; and (2) recording the average waveform component of RFV by a vulcanization factor in a computer.

Next, a preferable method of manufacturing a radial tire of the present invention will be described.

In the radial tire manufacturing method of the present invention, preferably, when the vulcanizer includes at least two vulcanization molds, in the average waveform recording step, an average waveform component of RFV by a vulcanization factor is acquired in each vulcanization mold and is record in a computer.

As a result, a green tire can be suitably vulcanized in each vulcanization mold.

In the radial tire manufacturing method of the present invention, more preferably, the selection step includes identifying the circumferential position on the green tire at which the RFV composite waveform has minimal amplitude and applying a bar code on the green tire for identifying this position.

Next, a more preferable method of manufacturing a radial tire according to the present invention will be described.

In the radial tire manufacturing method of the present invention, in the selection step, preferably, the bar code applied to the green tire identifies the selected circumferential position on the green tire.

In a conventional tire manufacturing step, in order to manufacture a tire having suitable uniformity, a green tire is mounted in a vulcanization mold so that, for example, a peak position of RRO of the green tire and a bottom position of RRO of the vulcanization mold coincide with each other.

When a bar code is applied to a green tire in a preferred embodiment of a method according to the present invention, it is not necessary to specifically indicate the peak position of RRO. The bar code is therefore advantageously used for identifying the selected the circumferential position on the green tire.

In the radial tire manufacturing method of the present invention, preferably, setting of the circumferential position on the green tire and the circumferential position in the vulcanization mold in the vulcanization step is effected on any one of a green tire stand and a loader.

Next, a still more preferable method of manufacturing a radial tire according to the present invention will be described.

In a conventional tire manufacturing step, a green tire is temporarily placed on a green tire stand on which the green tire can be rotatably supported, before being mounted and disposed in a vulcanization mold. The green tire placed on the green tire stand is conveyed by a loader to the vulcanization mold and is mounted at a predetermined position in the vulcanization mold.

The green tire stand supports rotatably the green tire placed thereon, and the loader is rotatable in a state of holding the green tire. Accordingly, setting of the circumferential position on the green tire and the circumferential position in the vulcanization mold can be directly conducted on the green tire stand or in the loader.

BRIEF DESCRIPTION OF THE DRAWINGS

FIG. 6 is a graph showing a composite waveform of the RRO waveform, the waveform of a molding factor, and the waveform of a vulcanization factor.

DESCRIPTION OF THE PREFERRED EMBODIMENTS

Referring now to FIGS. 1 to 5, a radial tire manufacturing method according to the present invention will be hereinafter described.

Figure 1:
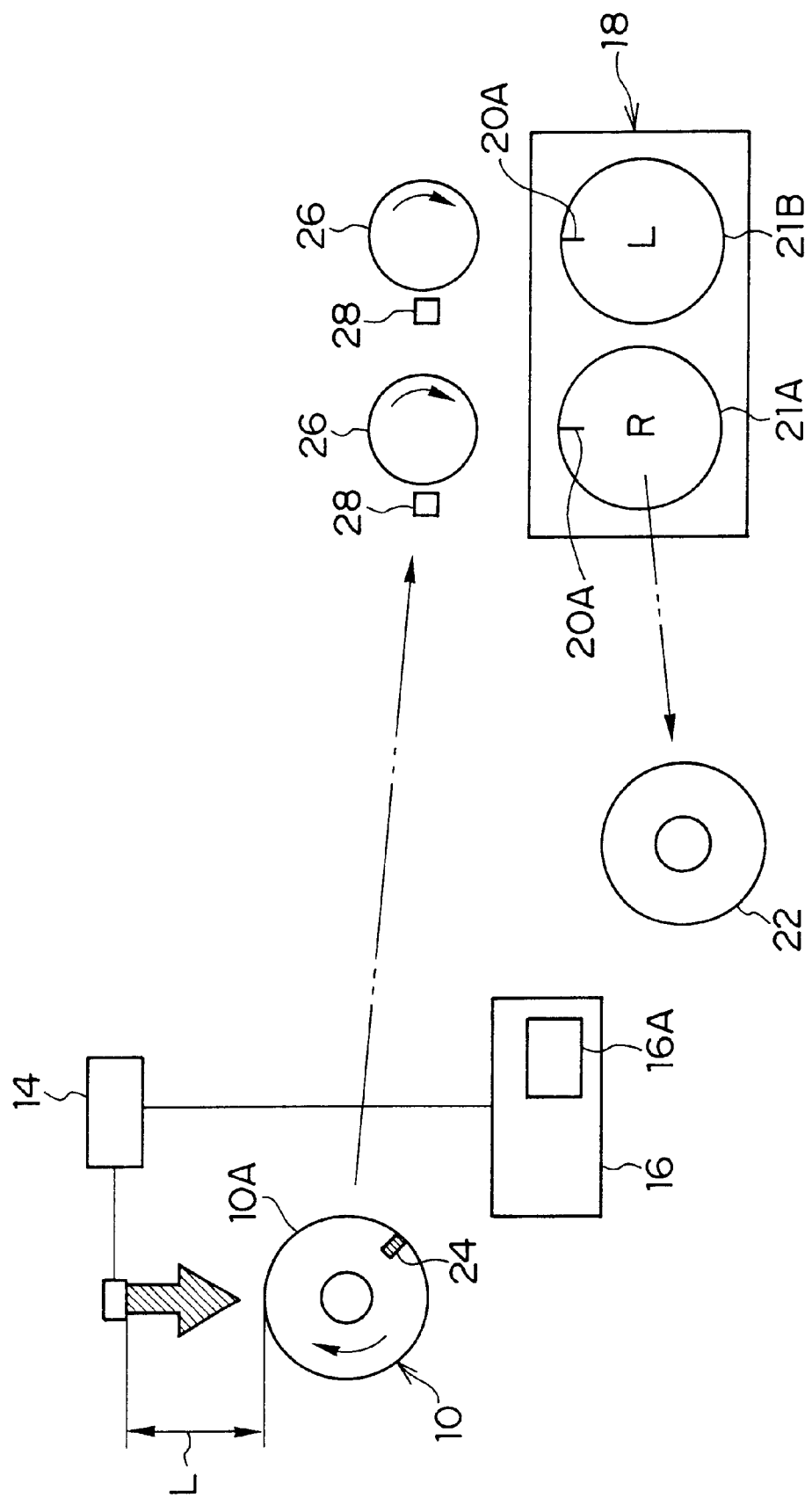
FIG. 1 is a schematic diagram showing a radial tire manufacturing method according to an embodiment of the present invention.

As illustrated in FIG. 1, in an RRO waveform measuring step, a green tire 10 molded by a public-known molding machine (not shown) is mounted in a wheel (not shown) and is filled with air of a predetermined internal pressure.

Figure 2:
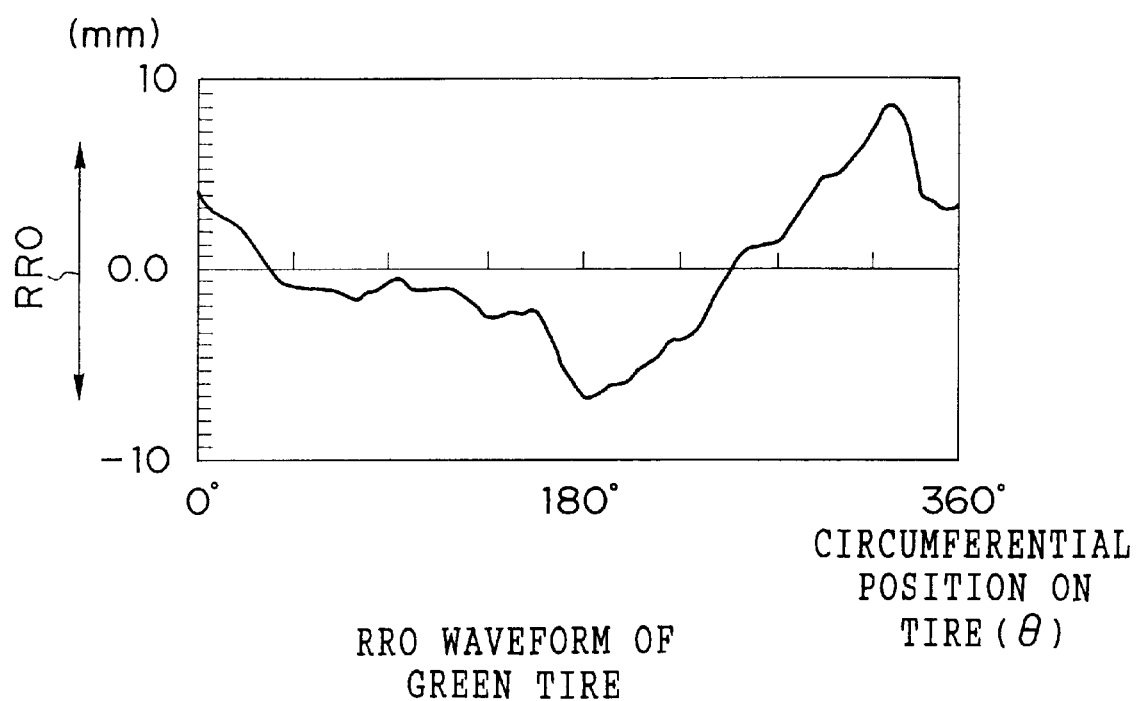
FIG. 2 is a graph showing the RRO waveform of a green tire in the radial tire manufacturing method according to the embodiment of the present invention.

A well-known laser displacement meter 14 is fixed so as to face a tread portion 10A of the green tire 10 in a state in which a detecting surface thereof is directed to the center of the green tire 10. A waveform of radial run out (RRO, that is, out of roundness) of the green tire 10 as shown in FIG. 2 is obtained by measuring a distance L between the tread portion 10A and the detecting surface of the laser displacement meter 14 using the laser displacement meter 14 while making one rotation of the green tire 10 and further by inputting the measured distance into a computer 16.

Figure 3:
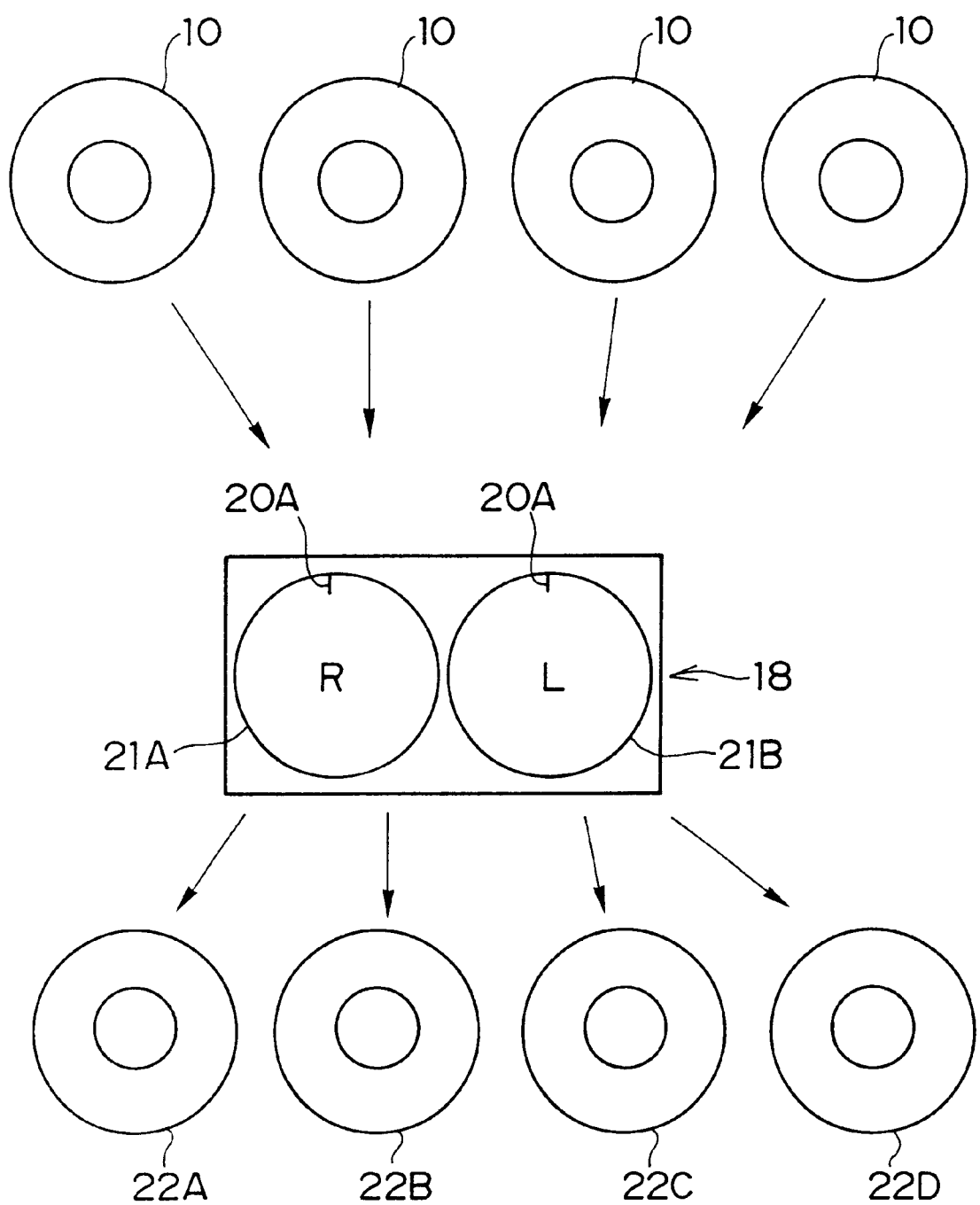
FIG. 3 is a schematic diagram showing a waveform recording step in the radial tire manufacturing method according to the embodiment of the present invention.

As shown in FIGS. 1 and 3, a vulcanizer 18 for vulcanizing the green tire 10 is equipped with two-plane molds 21A and 21B. Note that a plurality of vulcanizers 18 be installed in a factory.

In the average waveform recording step, namely, a step of recording an average waveform component of RFV which is a molding factor (hereinafter referred to as a waveform of molding factor) and a step of recording an average waveform component of RFV which is a vulcanization factor (hereinafter referred to as a waveform of vulcanization factor), as illustrated in FIG. 3, a plurality of green tires 10, preferably at least three green tires 10 (in the present embodiment, four green tires 10) are sequentially mounted and disposed in a vulcanization mold 21A of the vulcanizer 18, and four tires 22A, 22B, 22C, and 22D to be vulcanized are vulcanized to be molded. This operation is also carried out for a vulcanization mold 21B.

The four green tires 10 are each disposed in the vulcanization mold 21A by rotating a green tire reference position T by 90 degrees for each tire based on a circumferential reference position of the vulcanization mold 21A, for example, a vulcanization reference position 20A such as a stencil position.

As a result, there are obtained four vulcanized tires 22A, 22B, 22C, and 22D, namely, a tire vulcanized in such a state that the vulcanization reference position 20A and the green tire reference position T coincide with each other, a tire vulcanized in such a state that the vulcanization reference position 20A and the green tire reference position T are displaced from each other by 90 degrees, a tire vulcanized in such a state that the vulcanization reference position 20A and the green tire reference position T are displaced from each other by 180 degrees, and a tire vulcanized in such a state that the vulcanization reference position 20A and the green tire reference position T are displaced from each other by 270 degrees.

Next, an RFV waveform of each of the four vulcanized tires 22A, 22B, 22C, and 22D is measured by a well-known uniformity machine (not shown) and respective RFV waveforms of the four tires are obtained.

The RFV waveform of each tire can be represented by the following expression.

RFV waveform of a vulcanized tire=(molding factor waveform+ K×RRO waveform of green tire)+vulcanization factor waveform+ϵ wherein, K indicates a rate of contribution to RFV waveform (N/mm), and ϵ indicates a coefficient.

Namely,

RFV waveform of a vulcanized tire=(molding factor waveform +vulcanization factor waveform)+(K×RRO waveform of green tire)+vulcanization factor waveform+ϵ ... (1)

Respective RFV waveforms of the four tires with the vulcanization reference position 20A as a starting point are obtained by the computer 16 and these RFV waveforms are made to overlap with one another. As a result, the waveform of a molding factor resulting from a molding process is offset.

Respective RRO waveforms of the green tires 10 separately vary, and in a waveform overlapping step, an average value approximates to zero.

Figure 5:
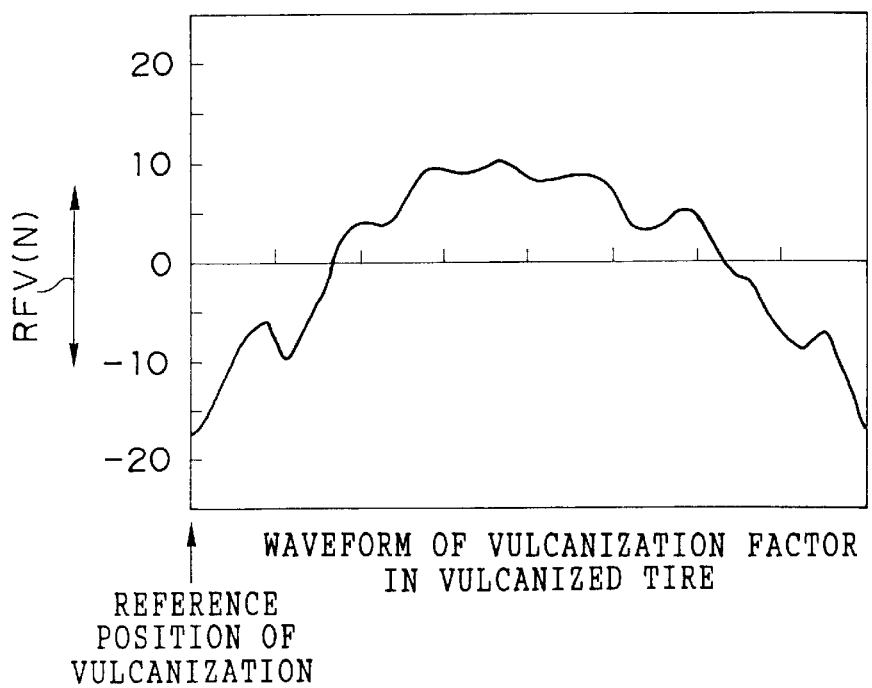
FIG. 5 is a graph showing a waveform of a vulcanization factor in the radial tire manufacturing method according to the embodiment of the present invention.

In other words, when respective RFV waveforms of the four vulcanized tires 22A, 22B, 22C, and 22D with the vulcanization reference position 20A as a starting point are made to overlap with one another and an average of the RFV waveforms is obtained, a vulcanization factor waveform with the vulcanization reference position 20A as a starting point is obtained as shown in FIG. 5.

Figure 4:
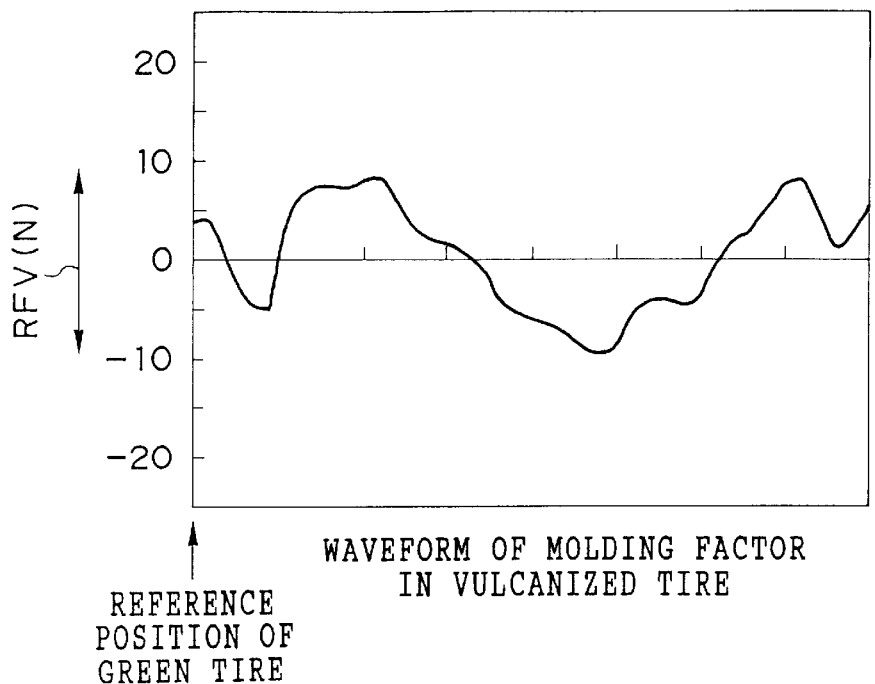
FIG. 4 is a graph showing a waveform of a molding factor in the radial tire manufacturing method according to the embodiment of the present invention.

Next, when an average of the overlapping RFV waveforms of the four vulcanized tires 22A, 22B, 22C, and 22D with the green tire reference position T as a starting point is mathematically processed using the computer 16, in a step in which the RFV waveforms are made to overlap with one another, a waveform of vulcanization factor which is caused by a vulcanization process of the green tire 10 is offset, and a molding factor waveform with the green tire reference position T as a starting point as shown in FIG. 4 is obtained.

The green tire reference position T mentioned herein indicates a specified position on the green tire 10 (for example, a joint portion of tread rubber), and a bar code 24 (any other indicating method may also be used) is applied thereto, for example, for identifying the position T.

The above-described molding factor waveform and vulcanization factor waveform are calculated by the computer 16 for each molding machine and for each vulcanization mold, and the calculated waveforms are stored, as known data, in a storage element 16A.

Next, a case in which K in the above-described expression (1), that is, a rate of contribution of RRO in the green tire 10 to the RFV waveform, is obtained will be described. The rate of contribution K is obtained by calculation from each RFV value, known data (molding factor, vulcanization factor), and respective RRO values, but generally, an average value of the plurality of green tires 10 is used as the rate of contribution K.

In a waveform synthesizing step, the RFV composite waveform is obtained by overlapping an RFV waveform component given by multiplying the RRO waveform (see FIG. 2) of the green tires 10 obtained in the RRO waveform measuring step by the rate of contribution K (unit: N/mm), the above-described known molding factor waveform (see FIG. 4) previously recorded in the computer 16, and a vulcanization factor waveform (see FIG. 5) of the vulcanization mold 21A using the computer 16.

In a selection step, respective waveforms are displaced from each other in a tire circumferential direction by a predetermined angle, and as shown in FIG. 6, an overlapping position in which a composite waveform of RRO waveforms, namely, an amplitude of a waveform (RFV) of a vulcanized tire becomes minimum (in the graph of FIG. 6, a horizontal axis indicates a relative angle of the bar code 24 and the vulcanization reference position 20A. In the present embodiment, RFV becomes minimum at a position in which the relative angle of the bar code 24 and the vulcanization reference position 20A is 225°) is selected.

In a vulcanization step, the green tire 10 is placed on a green tire stand 26 controlled by the computer 16, and when the green tire stand 26 rotates, the bar code 24 applied to the green tire 10 is detected by a bar code reader 28 provided in the green tire stand 26, and the computer 16 detects a position (angle) in a direction in which the green tire 10 is rotated.

Then, the computer 16 determines the position of each green tire 10 in the direction in which the tire rotates on the green tire stand 26 so that each green tire 10 is properly located in a position where it is set in a vulcanization furnace, which is obtained in the selection step.

The green tire 10 positioned on the green tire stand 26 is mounted and disposed at a predetermined position of the vulcanization mold 21A by a well-known loader (not shown), and thereafter, vulcanized. Further, the above-described process is also effected in a case of the mold 21B.

As described above, in the radial tire manufacturing method according to the present embodiment, the RRO waveform of each green tire 10 to be vulcanized is actually measured by the laser displacement meter 14 and the green tire 10 is positioned at the position where an amplitude of RFV waveform of the vulcanized tire 22 becomes minimum to a position in a circumferential direction of the selected vulcanization mold 21A or 21B, and therefore, radial direction force variation of the vulcanized tire 22 can sufficiently be reduced.

In the above-described embodiment, the bar code 24 is applied for identifying a specified position (for example, a joint portion of tread rubber) on the green tire 10, but any other methods than the bar code, which can merely be detected by a sensor, may also be used.

What is claimed is:

1. A radial tire manufacturing method comprising the steps of:
    (a) measuring an radial run-out (RRO) waveform of each green tire;
    (b) recording an average waveform component of radial force variation (RFV) of a molding factor in each molding machine for molding a green tire, and an average waveform component of RFV of a vulcanization factor in each vulcanizer for vulcanizing a green tire, in a computer;
    (c) synthesizing an RFV composite waveform including the sub-steps of:
        (1) converting an RRO waveform of each green tire into an RFV waveform component; and
        (2) superpositioning the recorded average waveform components of RFV of the molding factor and the vulcanization factor on the converted RFV waveform component;
    (d) selecting a circumferential position on a green tire at which an amplitude of said RFV composite waveform becomes minimum, and a circumferential position in said vulcanization mold; and
    (e) vulcanizing the green tire including the sub-steps of:
        (1) positioning said circumferential position on the green tire to said circumferential position in said vulcanization mold; and
        (2) loading said green tire in said mold.

2. A radial tire manufacturing method according to claim 1, wherein said step of recording an average waveform component of radial force variation (RFV) of a molding factor in each molding machine for molding a green tire, and an average waveform component of RFV of a vulcanization factor in each vulcanizer for vulcanizing a green tire, in a computer, comprises the sub-steps of:
    (1) sampling at least two vulcanized tires;
    (2) offsetting said molding factor from a plurality of RFV waveforms of said vulcanized tires; and
    (3) obtaining an average waveform component of RFV by said vulcanization factor.

3. A radial tire manufacturing method according to claim 1, wherein said step of recording an average waveform component of radial force variation (RFV) of a molding factor in each molding machine for molding a green tire, and an average waveform component of RFV of a vulcanization factor in each vulcanizer for vulcanizing a green tire, in a computer, comprises the sub-steps of:
    (1) sampling at least two vulcanized tires;
    (2) offsetting said molding factor from a plurality of RFV waveforms of said vulcanized tires; and
    (3) obtaining an average waveform component of RFV by said molding factor.

4. A radial tire manufacturing method according to claim 1, wherein said step of recording an average waveform component of radial force variation (RFV) of a molding factor in each molding machine for molding a green tire, and an average waveform component of RFV of a vulcanization factor in each vulcanizer for vulcanizing a green tire, if at least two vulcanization molds are provided in a vulcanizer, includes the steps of:
    (1) obtaining an average waveform component of RFV by a vulcanization factor for each vulcanization mold; and
    (2) recording said average waveform component of RFV by a vulcanization factor in the computer.

5. A radial tire manufacturing method according to claim 1, further comprising the step of applying a bar code to the green tire for identifying the circumferential position that was selected.

6. A radial tire manufacturing method according to claim 1, wherein said step of positioning said circumferential position on the green tire to said circumferential position in said vulcanization mold is effected on any one of a green-tire stand and a loader.

7. A radial tire manufacturing method according to claim 2, wherein said step of recording an average waveform component of radial force variation (RFV) of a molding factor in each molding machine for molding a green tire, and an average waveform component of RFV of a vulcanization factor in each vulcanizer for vulcanizing a green tire, in a computer, further comprises the sub-step of obtaining an average waveform component of RFV by said molding factor.

8. A radial tire manufacturing method according to claim 2, wherein said step of recording an average waveform component of radial force variation (RFV) of a molding factor in each molding machine for molding a green tire, and an average waveform component of RFV of a vulcanization factor in each vulcanizer for vulcanizing a green tire, if at least two vulcanization molds are provided in a vulcanizer, includes the steps of:
    (1) obtaining an average waveform component of RFV by a vulcanization factor for each vulcanization mold; and
    (2) recording said average waveform component of RFV by a vulcanization factor in the computer.

9. A radial tire manufacturing method according to claim 2, further comprising the step of applying a bar code to the green tire for identifying the circumferential position that was selected.

10. A radial tire manufacturing method according to claim 2, wherein said step of positioning said circumferential position on the green tire to said circumferential position in said vulcanization mold is effected on any one of a green-tire stand and a loader.

11. A radial tire manufacturing method according to claim 3, wherein said step of recording an average waveform component of radial force variation (RFV) of a molding factor in each molding machine for molding a green tire, and an average waveform component of RFV of a vulcanization factor in each vulcanizer for vulcanizing a green tire, if at least two vulcanization molds are provided in a vulcanizer, includes the steps of:
    (1) obtaining an average waveform component of RFV by a vulcanization factor for each vulcanization mold; and
    (2) recording said average waveform component of RFV by a vulcanization factor in the computer.

12. A radial tire manufacturing method according to claim 3, further comprising the step of applying a bar code to the green tire for identifying the circumferential position that was selected.

13. A radial tire manufacturing method according to claim 3, wherein said step of positioning said circumferential position on the green tire to said circumferential position in said vulcanization mold is effected on any one of a green-tire stand and a loader.

14. A radial tire manufacturing method according to claim 4, further comprising the step of applying a bar code to the green tire for identifying the circumferential position that was selected.

15. A radial tire manufacturing method according to claim 4, wherein said step of positioning said circumferential position on the green tire to said circumferential position in said vulcanization mold is effected on any one of a green-tire stand and a loader.

16. A radial tire manufacturing method according to claim 5, wherein said step of positioning said circumferential position on the green tire to said circumferential position in said vulcanization mold is effected on any one of a green-tire stand and a loader.

* * * * *